US009952425B2

(12) United States Patent
Kojima et al.

(10) Patent No.: US 9,952,425 B2
(45) Date of Patent: Apr. 24, 2018

(54) OPTICAL DEVICE AND IMAGE DISPLAY APPARATUS

(71) Applicant: Seiko Epson Corporation, Tokyo (JP)

(72) Inventors: Hisako Kojima, Chino (JP); Yasushi Mizoguchi, Suwa (JP); Shinichi Wakabayashi, Suwa (JP)

(73) Assignee: Seiko Epson Corporation (JP)

( * ) Notice: Subject to any disclaimer, the term of this patent is extended or adjusted under 35 U.S.C. 154(b) by 102 days.

(21) Appl. No.: 14/926,580

(22) Filed: Oct. 29, 2015

(65) Prior Publication Data

US 2016/0124217 A1    May 5, 2016

(30) Foreign Application Priority Data

Oct. 31, 2014 (JP) .................. 2014-223706

(51) Int. Cl.
   *G02B 26/08* (2006.01)
   *G02B 26/10* (2006.01)

(52) U.S. Cl.
   CPC ......... *G02B 26/105* (2013.01); *G02B 26/085* (2013.01); *G02B 26/0816* (2013.01)

(58) Field of Classification Search
   CPC ............ G02B 26/0816; G02B 26/0833; G02B 26/0841; G02B 26/085

USPC ......... 359/198.1–199.4, 200.6–200.8, 221.2, 359/225.1–226.2

See application file for complete search history.

(56) References Cited

U.S. PATENT DOCUMENTS

| 2009/0184775 A1 | 7/2009 | Komori et al. |
| 2010/0014142 A1* | 1/2010 | Akedo ................. B81B 3/0072 359/224.1 |

FOREIGN PATENT DOCUMENTS

| JP | 2009-171784 A | 7/2009 |
| JP | 2012-013766 A | 1/2012 |

* cited by examiner

*Primary Examiner* — James Phan
(74) *Attorney, Agent, or Firm* — Harness, Dickey & Pierce, P.L.C.

(57) ABSTRACT

An optical device includes: an optical portion that has a light incident surface on which light is incident; a movable portion that supports the optical portion; a shaft portion that supports the movable portion so that the movable portion is oscillatable; and a fixing portion that is connected to the shaft portion, wherein the fixing portion has a thickness greater than the shaft portion and includes a portion of which an end not connected to the shaft portion serves as a free end.

15 Claims, 15 Drawing Sheets

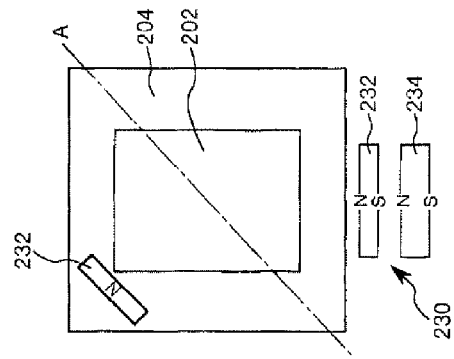
FIG.11C
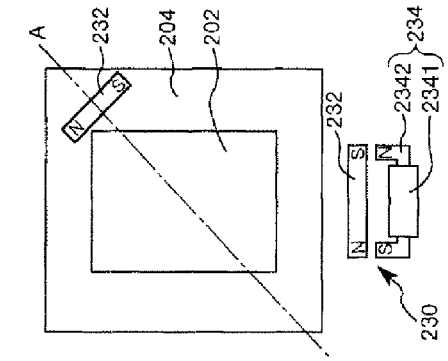
FIG.11D
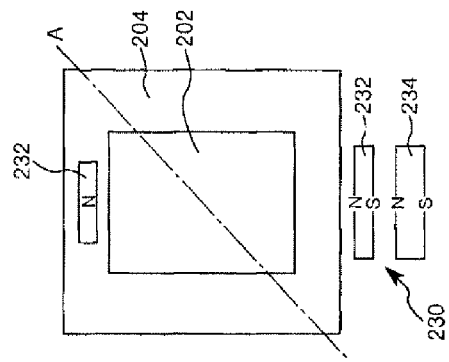
FIG.11G
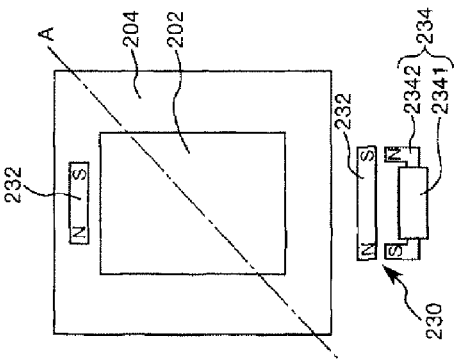
FIG.11H
FIG.11A
FIG.11B
FIG.11E
FIG.11F

OPTICAL DEVICE AND IMAGE DISPLAY APPARATUS

BACKGROUND

1. Technical Field

The present invention relates to an optical device and an image display apparatus.

2. Related Art

Projectors and head-mounted displays are known as projection type image display apparatuses in which images are generated by controlling the wavelength or intensity of light for each pixel in image forming elements including two-dimensionally arrayed pixels and the images are expanded and displayed by optical systems such as lenses. Liquid crystal elements or organic EL elements are used as the image forming elements and the resolutions of these elements are designed to be improved every year.

At present, in markets of image display apparatuses, products with resolutions called full high-visions have been spread. In future, these products are expected to migrate to, for example, products with high resolutions called 4K or 8K (super high-visions).

As one of the methods of realizing such high-resolution display, there is a method of using a pixel shift device (pixel shifter) shifting a projection position of an image generated by an image forming element. As the pixel shift device, a device shifting an optical path using refraction (optical modulation) in an optical element is known.

For example, JP-A-2009-171784 discloses an oscillation driving device that includes a flap in which a glass transmitting projection light of an image forming apparatus, a coil, and a belt-like plate spring bent by a propulsion force generated in the coil and generating a reactive force are fitted. The belt-like plate spring includes a twisting beam portion and supports the flap so that the flap can be oscillated. The twisting beam portion is connected to a bending beam portion formed to be vertical to an oscillation axis center. In the oscillation driving device, when a current flows in the coil, a propulsion force is generated and the flap in which the glass is fitted is oscillated against a spring reactive force of the belt-like plate spring. By oscillating the glass in this way, it is possible to shift a projection position of the light transmitted through the glass.

However, in such an oscillation driving device, the belt-like plate spring which is spread in a planar shape and for which a given area is necessary is used to oscillate the flap. Therefore, there is a problem that it is difficult to decrease an occupation area of the device.

On the other hand, in order to decrease the occupation area, a bending beam portion formed to be vertical to the oscillation axis center can be considered to be omitted in the oscillation driving device disclosed in JP-A-2009-171784. In this case, however, since it is necessary to oscillate the twisting beam portion, it is necessary to lengthen the length of the twisting beam portion sufficiently in order to obtain a predetermined oscillation frequency while sufficiently decreasing generated stress. Consequently, the twisting beam portion may be lengthened.

SUMMARY

An advantage of some aspects of the invention is that it provides an optical device which is miniature and in which generated stress is small and an image display apparatus which includes the optical device and is capable of realizing high quality display.

Such an advantage can be attained by the following configurations.

An optical device according to an aspect of the invention includes: an optical portion that has a light incident surface on which light is incident; a movable portion that supports the optical portion; a shaft portion that supports the movable portion so that the movable portion is oscillatable; and a fixing portion that is connected to the shaft portion. The fixing portion has a thickness greater than the shaft portion and includes a portion of which an end not connected to the shaft portion serves as a free end.

With this configuration, since the fixing portion has not only the function of supporting the shaft portion but also the function of a beam oscillating the movable portion, it is possible to obtain the optical device which is miniature and in which stress generated at the time of oscillation of the movable portion is small.

It is preferable that the optical device according to the aspect of the invention further includes a permanent magnet that is provided in the movable portion; and a coil that generates a magnetic field to be operated to the permanent magnet.

With this configuration, the magnetic interaction is generated between the permanent magnet and the coil, and thus it is possible to generate a driving force to the permanent magnet.

It is preferable that the optical device according to the aspect of the invention further includes a support portion that supports the fixing portion, and the support portion supports the fixing portion at a position at which the portion serving as the free end is excluded.

With this configuration, the portion serving as the free end is prevented from being directly supported by the support portion, and thus this portion can be displaced with a sufficient displacement amount. As a result, it is possible to oscillate the movable portion at a necessary oscillation angle without causing local stress concentration.

In the optical device according to the aspect of the invention, it is preferable that an elastic modulus of each of the movable portion, the shaft portion, and the fixing portion is smaller than an elastic modulus of the optical portion.

With this configuration, a twistable property (a nature in which the shaft portions can be twisted) is given to the shaft portion and a flexible property (a nature in which the fixing portions are flexible) is given to the fixing portions. Further, a function of suppressing deformation and precisely transferring a driving force generated by the driving portion to the entire movable portion is given to the optical portion. Therefore, a displacement amount at the time of the oscillation of the movable portion is stabilized, and thus it is possible to deflect light transmitted through the optical portion in a target deflection direction or by a target amount.

In the optical device according to the aspect of the invention, it is preferable that each of the movable portion, the shaft portion, and the fixing portion is formed of a resin material.

With this configuration, a twistable property (a nature in which the shaft portions can be twisted) is given to the shaft portion and a flexible property (a nature in which the fixing portions are flexible) is given to the fixing portions. Further, a function of suppressing deformation and precisely transferring a driving force generated by the driving portion to the entire movable portion is given to the optical portion. Therefore, a displacement amount at the time of the oscillation of the movable portion is stabilized, and thus it is possible to deflect light transmitted through the optical portion in a target deflection direction or by a target amount.

Since a resin material has relatively large elasticity, the resin material contributes to attenuation of unnecessary vibration occurring in the optical portion due to the oscillation. Thus, it is possible to prevent the light deflected by the optical portion from being deflected in an unintended direction.

In the optical device according to the aspect of the invention, it is preferable that, in the fixing portion, a thickness of a portion connected to the shaft portion is thicker than a thickness of a portion mutually adjacent to the portion connected to the shaft portion.

With this configuration, the portion connected to the shaft portion is the portion serving as the free end. Therefore, by thickening the thickness of this portion, it is possible to secure relatively large displacement amount when the portion is displaced. Therefore, this portion can be displaced more considerably, and thus an alleviation width of stress occurring inside the fixing portion can be accordingly further enlarged. Further, the oscillation angle can be sufficiently enlarged.

In the optical device according to the aspect of the invention, it is preferable that the optical portion transmits light.

With this configuration, by changing the posture of the optical portion so that the incident angle of the light incident on the optical portion becomes a target angle, it is possible to control a deflection direction or a deflection amount of the transmitted light.

In the optical device according to the aspect of the invention, it is preferable that the optical portion reflects light.

With this configuration, by changing the posture of the optical portion so that the incident angle of the light incident on the optical portion becomes a target angle, it is possible to control a deflection direction or a deflection amount of the reflected light.

An image display apparatus according to another aspect of the invention includes the optical device according to the aspect of the invention.

With this configuration, it is possible to obtain the image display apparatus which is miniature and has high reliability.

In the image display apparatus according to the aspect of the invention, it is preferable that a position of a pixel displayed by radiating the light is shifted by changing an optical path of light exiting from the optical device in the optical device.

With this configuration, for example, a high resolution of the projected image can be achieved without increasing the number of pixels of the image formed by the light incident on the optical portion.

In the image display apparatus according to the aspect of the invention, it is preferable that the optical device allows the light to scan to form an image.

With this configuration, it is possible to achieve the high resolution of the projected image.

BRIEF DESCRIPTION OF THE DRAWINGS

The invention will be described with reference to the accompanying drawings, wherein like numbers reference like elements.

FIGS. 11A and 11B are diagrams illustrating a configuration example of a driving portion according to the first embodiment.

FIGS. 11C to 11H are diagrams illustrating other configuration examples of a driving portion in which an electromagnetic actuator scheme is adopted.

DESCRIPTION OF EXEMPLARY EMBODIMENTS

Hereinafter, an optical device and an image display apparatus will be described in detail according to preferred embodiments illustrated in the appended drawings.

First Embodiment

Projector

An optical path deflection element to which a first embodiment of the optical device according to the invention is applied and a projector to which the first embodiment of the image display apparatus according to the invention is applied will be described.

Figure 1:
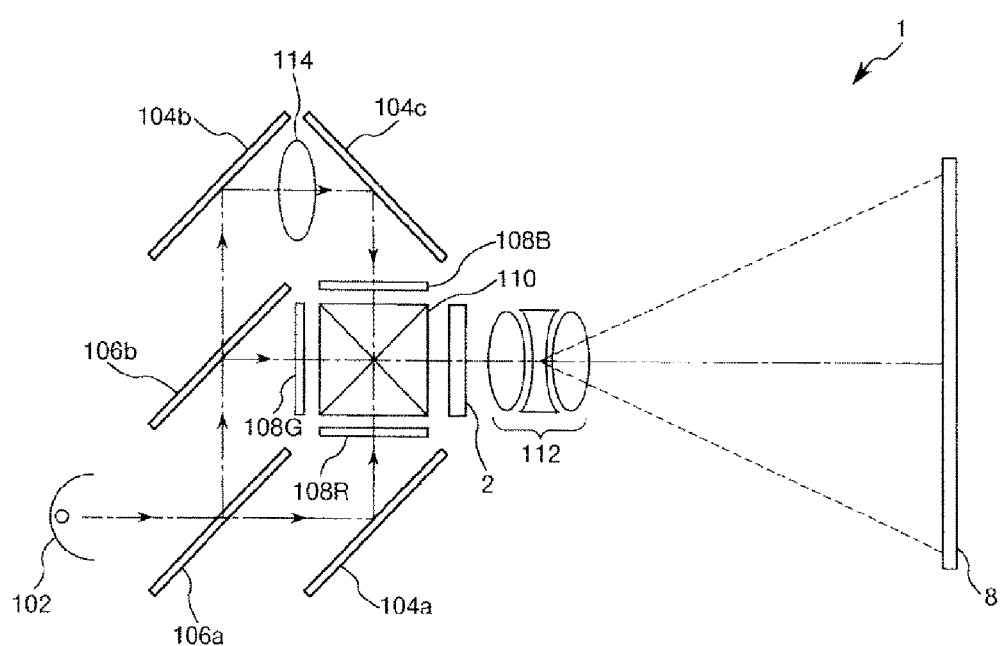
FIG. 1 is a diagram illustrating an optical configuration of a projector to which a first embodiment of an image display apparatus according to the invention is applied.
Figure 2:
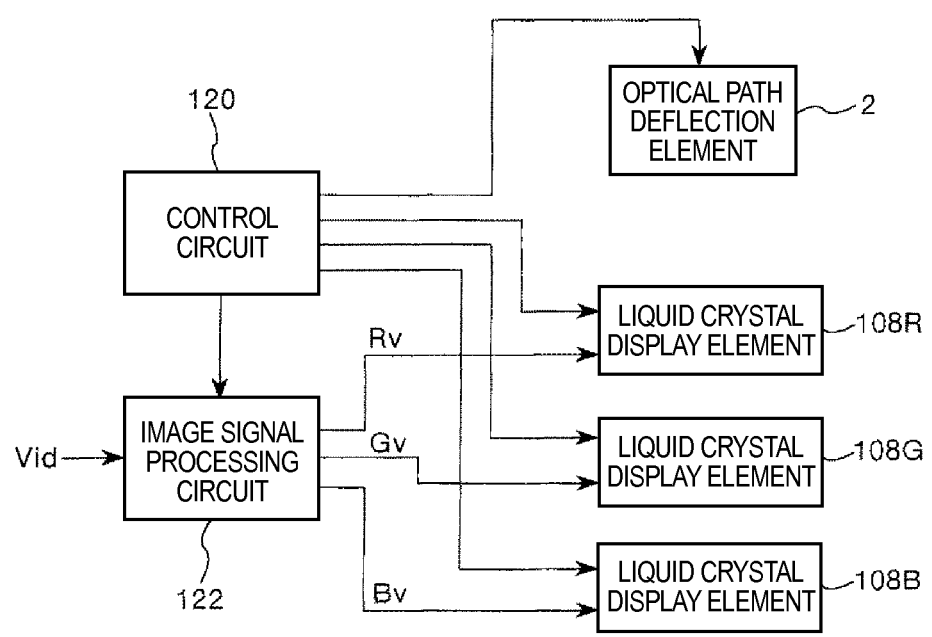
FIG. 2 is a block diagram illustrating an electric configuration of the projector illustrated in FIG. 1.
Figure 3:
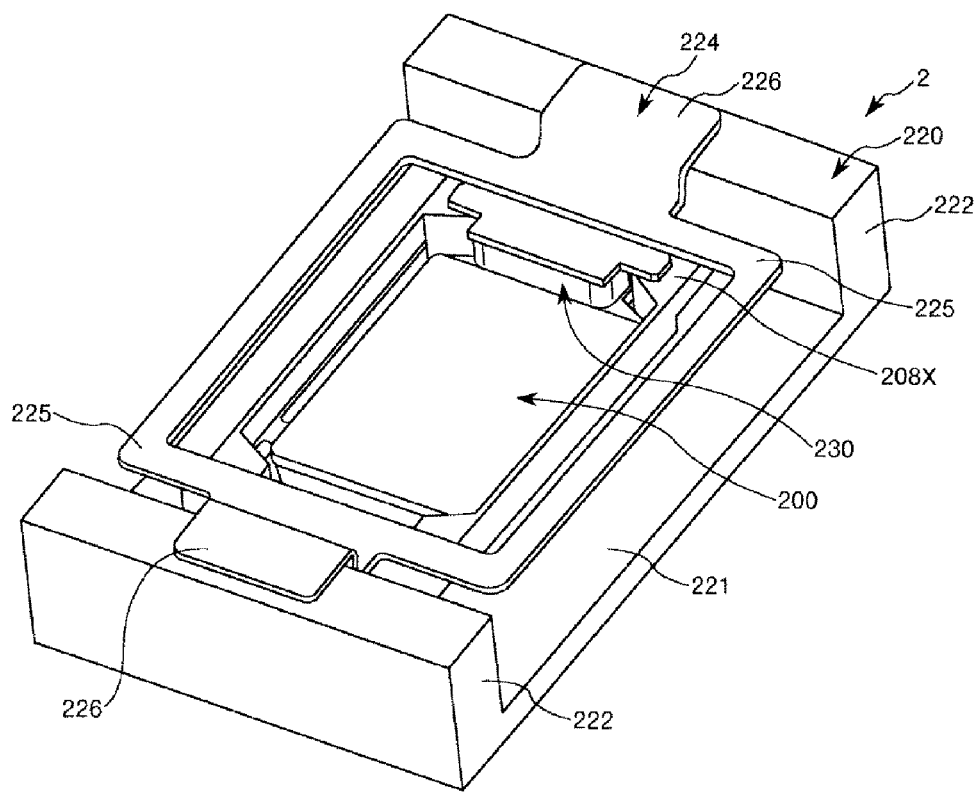
FIG. 3 is a perspective view illustrating the configuration of an optical path deflection element (first embodiment of an optical device according to the invention) illustrated in FIG. 1.
Figure 4:
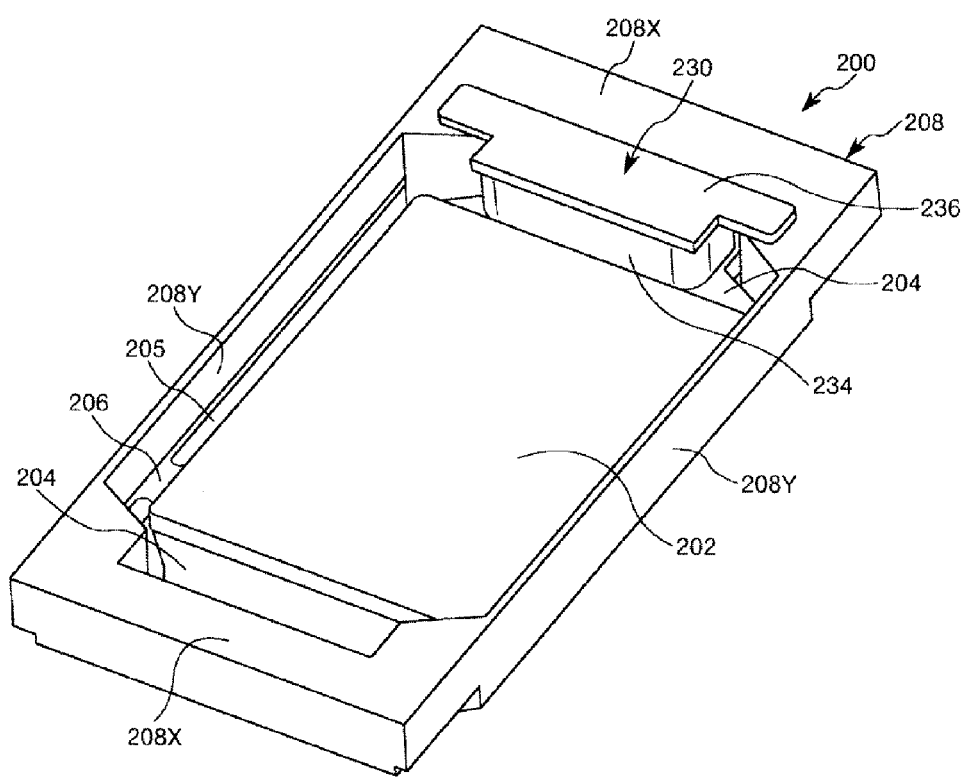
FIG. 4 is an enlarged perspective view illustrating the periphery of functional portions and a driving portion in the optical path deflection element illustrated in FIG. 3.
Figure 5:
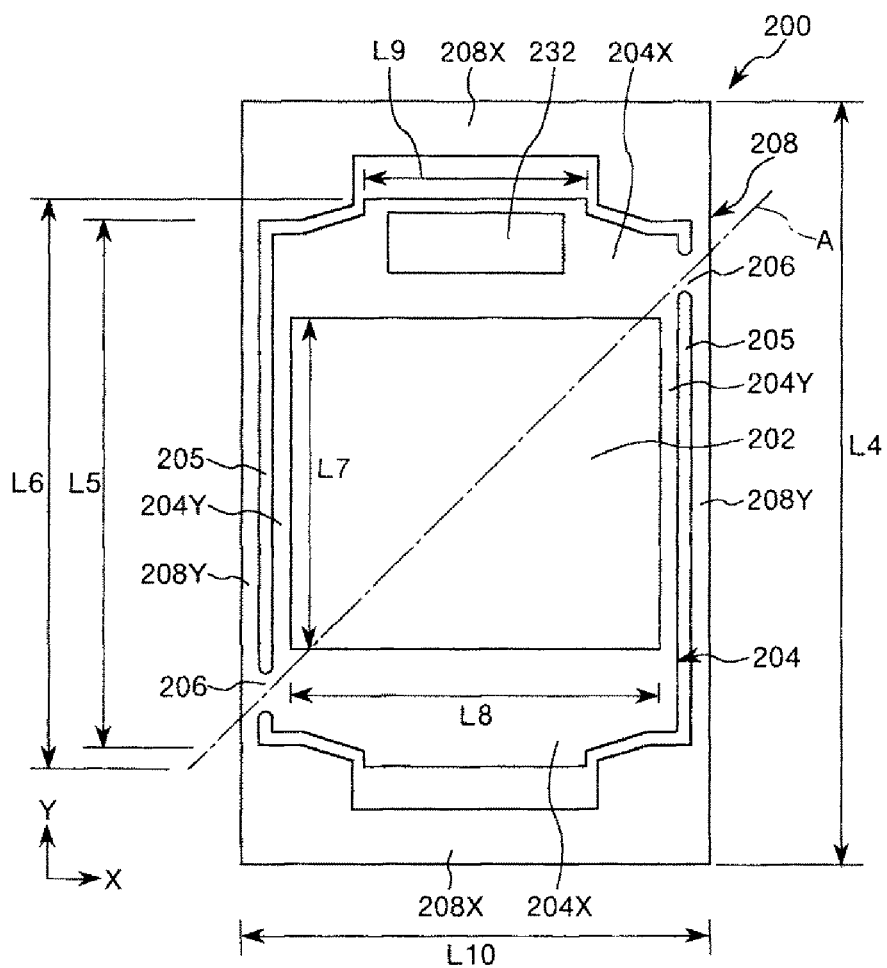
FIG. 5 is a plan view illustrating the functional portions illustrated in FIG. 4.

FIG. 1 is a diagram illustrating an optical configuration of a projector to which the first embodiment of the image display apparatus according to the invention is applied. FIG. 2 is a block diagram illustrating an electric configuration of the projector illustrated in FIG. 1. FIG. 3 is a diagram illustrating the configuration of the optical path deflection element (the first embodiment of the optical device according to the invention) illustrated in FIG. 1. FIG. 4 is an enlarged perspective view illustrating the periphery of functional portions and a driving portion in the optical path deflection element illustrated in FIG. 3. FIG. 5 is a plan view illustrating the functional portions illustrated in FIG. 4. In the following description, in the optical path deflection element, a surface illustrated in FIG. 5, that is, a surface on which a driving portion is mounted is referred to as a "rear surface" and an opposite surface to the surface is referred to as a "front surface (outer surface)" to facilitate the description. In FIG. 5, a part of the driving portion is not illustrated.

A projector 1 illustrated in FIG. 1 is a projection type projector that enlarges and projects an image displayed in a liquid crystal element.

As illustrated in FIG. 1, the projector 1 according to the embodiment includes a light source 102, three mirrors 104a, 104b, and 104c, two dichroic mirrors 106a and 106b, three liquid crystal display elements 108R, 108G, and 108B, a dichroic prism 110, an optical path deflection element 2, a projection lens system 112, and a relay lens 114. Hereinafter, the configuration of each unit will be described in detail.

An optical configuration of the projector 1 will be described.

Examples of the light source 102 include a halogen lamp, a mercury lamp, a light-emitting diode (LED). A light source exiting white light is used as the light source 102.

Each of the three mirrors 104a, 104b, and 104c has a function of converting an optical path inside the projector 1 through reflection.

On the other hand, each of the two dichroic mirrors 106a and 106b has a function of separating white light exiting from the light source 102 into the three primary colors of R (red), G (green), and B (blue) and guiding the separated light to the mutually different liquid crystal display elements 108R, 108G, and 108B.

For example, the dichroic mirror 106a has a function of transmitting the light with a wavelength band of R and reflecting the light with wavelength bands of G and B in the white light. On the other hand, the dichroic mirror 106b has a function of transmitting the light with the wavelength band of B in the light with the wavelength bands of G and B reflected from the dichroic mirror 106a and reflecting the light with the wavelength band of G.

Through the reflection by the dichroic mirrors 106a and 106b, the length of the optical path of the light with the wavelength band of B is longer than the lengths of the optical paths of the other light. Accordingly, by providing a relay lens 114 in a midway point of the optical path of the wavelength band of B, deviation in the optical path is corrected.

Each of the liquid crystal display elements 108R, 108G, and 108B is used as a spatial optical modulator. The liquid crystal display elements 108R, 108G, and 108B are transmissive spatial optical modulators corresponding to the primary colors of R, G, and B, respectively, include, for example, pixels arrayed in a matrix form of vertical 1080 rows and horizontal 1920 columns. In the pixels, the optical amount of transmitted light with respect to incident light is adjusted and an optical amount distribution of all the pixels in the liquid crystal display elements 108R, 108G, and 108B is cooperatively controlled.

In the liquid crystal display elements 108R, 108G, and 108B, scanning lines and data lines are provided in correspondence to the pixels (not illustrated). Liquid crystal is disposed between pixel electrodes and a common electrode disposed to face the pixel electrodes in correspondence to positions at which the scanning lines and the data lines intersect each other (not illustrated).

In addition to these elements, polarizing plates (not illustrated) are provided in the liquid crystal display elements 108R, 108G, and 108B. When voltages of the data lines are applied to the pixel electrodes through selection of the scanning lines, liquid crystal molecules are oriented and the transmitted light is polarized. By appropriately setting the polarization by the liquid crystal molecules and the disposition of the polarizing plates, the optical amount of transmitted light can be adjusted for each pixel.

The light spatially modulated by the liquid crystal display elements 108R, 108G, and 108B is incident on the dichroic prism 110 in three directions. Of the incident light, the light with the wavelength bands of R and B is refracted at 90° and exits. On the other hand, the light with the wavelength band of G goes straightly and exits. As a result, the light exiting from the dichroic prism 110 includes a full-color image in which images from the primary colors of R, G, and B are synthesized, and the full-color image is incident on the optical path deflection element 2.

The optical path deflection element 2 will be described in detail below. The optical path deflection element 2 includes an optical member and can appropriately select whether the light incident on the optical member is deflected (shifted).

The light transmitted through the optical path deflection element 2 is incident on the projection lens system 112.

The projection lens system 112 is a compound lens system in which a plurality of lenses are combined. An image synthesized in the compound lens system 112 is enlarged and projected to a screen 8.

Next, an electric configuration of the projector 1 will be described.

The projector 1 according to the embodiment includes a control circuit 120 and an image signal processing circuit 122 in addition to the optical path deflection element 2 and the liquid crystal display elements 108R, 108G, and 108B described above.

The control circuit 120 controls an operation of writing data signals to the liquid crystal display elements 108R, 108G and 108B, an optical path deflection operation in the optical path deflection element 2, and an operation of generating the data signals in the image signal processing circuit 122.

The image signal processing circuit 122 has a function of separating an image signal Vid supplied from an external apparatus (not illustrated) for each of the three primary colors of R (red), G (green), and B (blue) and converting the image signal Vid into data signals Rv, Gv and Bv proper for operations of the liquid crystal display elements 108R, 108G, and 108B. The converted data signals Rv, Gv, and Bv are supplied to the liquid crystal display elements 108R, 108G, and 108B, respectively, and the liquid crystal display elements 108R, 108G, and 108B operate based on the data signals Rv, Gv, and Bv.

Structure of Optical Path Deflection Element

As illustrated in FIGS. 3 to 5, the optical path deflection element 2 includes an optical portion 202 that deflects light, a frame-shaped movable portion 204 that supports the edge of the optical portion 202, a shaft portion 206 that supports the movable portion 204 so that the movable portion 204 is oscillatable, and a fixing portion 208 to which the shaft portion 206 is connected.

Of these portions, the optical portion 202 is configured to be oscillated using the shaft portion 206 as an oscillation shaft so that a posture of the optical portion 202 is changed. With the change in the posture of the optical portion 202, an exit direction of the light transmitted through the optical portion 202 can be changed (the position of an optical path can be changed). Thus, the images combined in the dichroic prism 110 can be deflected (shifted) in any direction.

In the following description, the optical portion 202, the movable portion 204, the shaft portion 206, and the fixing portion 208 described above are collectively referred to as functional portions 200.

The optical path deflection element 2 further includes a casing 220 that holds the entire optical path deflection element 2 and is used to fix the optical path deflection element 2 to the inside of the projector 1 and a casing fitting portion 224 (support portion) that is interposed between the casing 220 and the optical path deflection element 2 to mutually fix the casing 220 and the optical path deflection element 2.

As illustrated in FIGS. 3 and 4, the optical path deflection element 2 includes a driving portion 230 that drives the optical portion 202 so that the optical portion 202 is oscillated. The optical portion 202 is oscillated by a driving force generated by the driving portion 230.

Hereinafter, the configuration of each portion of the optical path deflection element 2 will be described in detail.

Functional Portions

Each of the functional portions 200 will be described.

The optical portion 202 according to the embodiment is configured as a plate-shaped body having a light transmission property, and thus plate surfaces (main surfaces facing each other) of the plate-shaped body function as light incident surfaces. According to an incident angle of the light, the light incident on the light incident surfaces of the optical portion 202 is transmitted while going straight through the optical portion 202 or is transmitted while being refracted (spatially modulated). Thus, by changing the posture of the optical portion 202 so that a target incident angle is formed, it is possible to control a deflection direction or a deflection amount of the transmitted light.

In the embodiment, the front surface of the optical portion 202 serves as a light incident surface and the rear surface thereof serves as a light exit surface, but the incident direction of the light is not particularly limited.

Examples of the material of the optical portion 202 include, for example, various crystal materials such as crystal and sapphire, various glass materials such as borosilicate glass (crown glass, super white glass, and Tempax (registered trademark)), lead glass (flint glass), and quartz glass, and various resin materials such as a polycarbonate-based resin and an acrylic-based resin. Of these materials, an inorganic based material is preferably used. According to an inorganic based material, the elastic modulus of the optical portion 202 is large. In other words, rigidity thereof is large. Therefore, deflection irregularity of an image deflected in the optical portion 202 is suppressed.

The optical portion 202 according to the embodiment is formed in a rectangular shape (square shape) in a plan view, as illustrated in FIG. 5. The size of the optical portion 202 in a plan view is set appropriately so that a light beam exiting from the dichroic prism 110 can be transmitted. In FIG. 5 and the other drawings, the vertical direction is referred to as the Y axis direction and the horizontal direction is referred to as the X axis direction. The leading side of an arrow indicating the X axis is referred to as a + (positive) side and a base side thereof is referred to as a − (negative) side.

The frame-shaped movable portion 204 is provided to surround the edge of the optical portion 202. The movable portion 204 is preferably formed of a material with a smaller elastic modulus than the material of the optical portion 202.

By forming the movable portion 204 of this material, it is possible to suppress stress occurring with oscillation from leading to unnecessary vibration of the optical portion 202 itself to the minimum. That is, the movable portion 204 with the smaller elastic modulus surrounds the edge of the optical portion 202. Therefore, when the posture of the optical portion 202 is changed, the stress occurring in the optical portion 202 can be suppressed small, and thus unnecessary vibration occurring in the optical portion 202 itself with a stress distribution can be suppressed small. As a result, it is possible to prevent an image deflected by the optical portion 202 from being deflected in an unintentional direction.

The movable portion 204 includes two movable portions 204X extending in the X axis direction and two movable portions 204Y extending in the Y axis direction. Accordingly, in the optical portion 202 formed in the rectangular shape in a plan view, edged parallel in the X axis direction are supported by the movable portions 204X and edges parallel in the Y axis direction are supported by the movable portions 204Y.

In a plan view, a fixing portion 208 is formed on the outer side of each movable portion 204Y, that is, on the opposite side of each movable portion 204Y to the optical portion 202 via a void portion 205. The fixing portion 208 is formed in a frame shape surrounding the movable portions 204 via the void portion 205.

The fixing portion 208 includes two fixing portions 208X extending in the X axis direction and two fixing portions 208Y extending in the Y axis direction.

Each fixing portion 208X and each fixing portion 208Y are connected to each other at each end. That is, the end of one fixing portion 208Y is connected to one end of each fixing portion 208X and the end of the other fixing portion 208Y is connected to the other end of each fixing portion 208X. Thus, the fixing portions 208X and the fixing portions 208Y are connected in a frame shape.

Of the two movable portions 204X, the end on the +X side of the movable portion 204X located on the +Y side of the optical portion 202 is connected to the fixing portion 208Y mutually adjacent to this end via the shaft portion 206. The shaft portion 206 is disposed over the void portion 205, and thus the movable portion 204 is supported with respect to the fixing portion 208Y by the shaft portion 206.

On the other hand, of the two movable portions 204X, the end on the −X side of the movable portion 204X located on the −Y side of the optical portion 202 is connected to the fixing portion 208Y mutually adjacent to this end via the shaft portion 206. The shaft portion 206 is disposed across the void portion 205, and thus the movable portion 204 is supported with respect to the fixing portion 208Y by the shaft portion 206.

As described above, the movable portions 204 and the fixing portions 208 are connected via the two shaft portions 206.

Since the two shaft portions 206 can be twisted, the two shaft portions 206 are disposed on an oscillation axis A when the movable portions 204 are oscillated. That is, the oscillation axis A is set to be oblique to the outer edge of the optical portion 202 formed in the rectangular shape in a plan view (in both sides of the X and Y axes). By oscillating the movable portions 204 along the oscillation axis A, it is possible to change the posture of the optical portion 202 and control a deflection direction or a deflection amount of the light transmitted through the optical portion 202.

Figure 6:
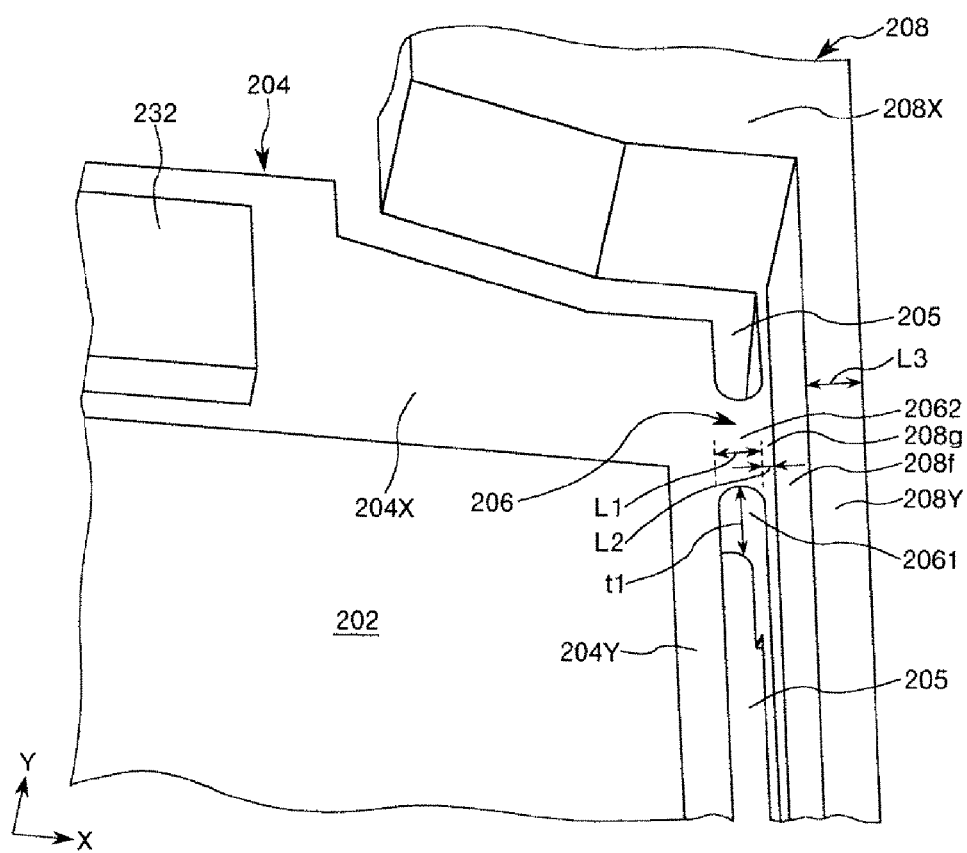
FIG. 6 is a partially enlarged perspective view illustrating the functional portions illustrated in FIG. 4.

Here, FIG. 6 is a partially enlarged perspective view illustrating the functional portions illustrated in FIG. 4. In FIG. 6, a part of the driving portion is not illustrated.

As illustrated in FIG. 6, the shaft portion 206 is a portion that is provided across the void portion 205 separating the movable portion 204X from the fixing portion 208Y. In the shaft portion 206, a side surface 2061 facing the void portion 205 is formed in as curved shape, as illustrated in FIG. 6. Thus, when the movable portions 204 are oscillated along the oscillation axis A, it is possible to prevent stress from being concentrated locally in the shaft portion 206. As a result, it is possible to prevent the characteristics of the shaft portion 206 from deteriorating.

The movable portions 204, the shaft portions 206, and the fixing portions 208 may be formed by adhering the separate portions to each other, but are preferably integrated. Thus, it is possible to improve shock resistance or long-term durability of connection portions between the movable portions 204 and the shaft portions 206 or connection portions between the fixing portions 208 and the shaft portions 206.

As in the movable portion 204, each of the shaft portions 206 and the fixing portions 208 is preferably formed of a material with a smaller elastic modulus than the material of the optical portion 202 (hereinafter shortly referred to as a "low elastic modulus material") and is specifically formed of a resin material. Thus, a twistable property (a nature in which the shaft portions can be twisted) is given to the shaft portions 206 and a flexible property (a nature in which the fixing portions are flexible) is given to the fixing portions 208. As a result, the optical portion 202 and the movable portions 204 can be oscillated at a sufficient oscillation angle mainly about the oscillation axis A.

On the other hand, functions of suppressing deformation and precisely transferring a driving force generated by the driving portion 230 to the entire movable portions 204 are given to the optical portion 202. Therefore, a displacement amount at the time of the oscillation of the optical portion 202 and the movable portions 204 is stabilized, and thus it is possible to deflect the light transmitted through the optical portion 202 in a target deflection direction or by a target amount.

In particular, a resin material is preferable as the low elastic modulus material. Since a resin material has relatively large elasticity, the resin material contributes to attenuation of unnecessary vibration occurring in the optical portion 202 due to the oscillation. That is, by forming the movable portions 204 of a resin material, it is possible to suppress unnecessary vibration of the optical portion 202 generated based on a distribution of stress occurring due to the oscillation to be small. As a result, it is possible to prevent the light deflected by the optical portion 202 from being deflected in an unintended direction.

Examples of the resin material include polyethylene, polypropylene, silicon, polyacetal, polyamide, polycarbonate, polyphenylene ether, polyethylene terephthalate, polybutylene terephthalate, polyarylate, polysulphone, polyether sulfone, polyphenylene sulfide, polyether ether ketone, polyimide, polyetherimide, and fluororesin. A material including at least one thereof is used.

A tensile elastic modulus (Young's modulus) of the low elastic modulus material may be less than the elastic modulus of the material of the optical portion 202 and is preferably set within a predetermined range.

When the tensile elastic modulus of the low elastic modulus material is assumed to be 1, the tensile elastic modulus of the material of the optical portion 202 is preferably 7 or more, is more preferably 10 or more and less than 40, and is further more preferably 26 or more and less than 31. By appropriately selecting the material of the optical portion 202 and the low elastic modulus material so that a ratio of the tensile elastic modulus is within the foregoing range, it is possible to cause oscillation easiness of the optical portion 202 and stability of the displacement amount at the time of the oscillation to be compatible. That is, when a ratio of the tensile elastic modulus of the material of the optical portion 202 to the tensile elastic modulus of the low elastic modulus material is less than the foregoing lower limit value, the rigidity of the optical portion 202 is not sufficient depending on an oscillation condition. Therefore, the driving force generated by the driving portion 230 is easily attenuated or the tensile elastic modulus of the low elastic modulus material is relatively larger, it is difficult to twist the shaft portions 206, and thus there is a concern of the displacement amount at the time of the oscillation being small. Conversely, when the ratio of the tensile elastic modulus of the material of the optical portion 202 to the tensile elastic modulus of the low elastic modulus material is greater than the foregoing upper limit value, the tensile elastic modulus of the low elastic modulus material is relatively small depending on an oscillation condition, and thus there is a concern of the durability of the shaft portions 206 being deteriorating.

For example, the tensile elastic modulus of the low elastic modulus material is preferably about 0.1 GPa or more and about 10 GPa or less and is more preferably about 0.5 GPa or more and about 7 GPa or less. By setting the tensile elastic modulus of the low elastic modulus material within the foregoing range, it is possible to realize the shaft portions 206 with an excellent twistable property and it is possible to realize the movable portions 204 with given rigidity with which the posture of the optical portion 202 can be maintained while suppressing an influence of the force of gravity. When this material is applied to the fixing portion 208, a sufficient flexible property can be given. Therefore, warping can be sufficiently realized in at least a thickness direction, and thus the fixing portions 208 capable of alleviating stress concentration can be accordingly realized.

For example, the tensile elastic modulus of the material of the optical portion 202 is preferably about 20 GPa or more and about 1000 GPa or less, and is more preferably about 30 GPa or more and about 200 GPa or less. By setting the tensile elastic modulus of the material of the optical portion 202 within the foregoing range, it is possible to suppress the deformation of the optical portion 202 and precisely transfer the driving force generated by the driving portion 230 to the entire movable portions 204. Therefore, the displacement amount at the time of the oscillation of the optical portion 202 is stabilized, and thus the light transmitted through the optical portion 202 can be deflected in a target direction or can be deflected by a target amount.

A pixel group that forms an image deflected by the optical portion 202 is a pixel collective in which columns of pixels arrayed in parallel to the X axis are arrayed along the Y axis. That is, the pixel group is disposed in a matrix form on the XY plane. The number of pixels is not particularly limited, but is considered to be 1920 lines in the X axis direction and 1080 lines in the Y axis direction.

The image (pixel group) in which the pixels are disposed in the matrix form is deflected when the image is transmitted through the optical portion 202. However, as described above, when the oscillation axis A of the optical portion 202 is obliquely inclined with respect to both of the X and Y axes, a deflection direction of the image is also oriented in the oblique direction to both of the X and Y axes. Thus, for example, when an image projected to the screen 8 has a rectangular shape, the image can be shifted obliquely with respect to both of the vertical and horizontal sides. As a result, since the vertical and horizontal resolutions of the image can be substantially increased, for example, the projected image can be realized with a high resolution without increasing the number of pixels of the liquid crystal display elements 108R, 108G, and 108B.

The two shaft portions 206 are preferably disposed at positions at which a point symmetry relation is satisfied with respect to the center of the optical portion 202 at a plan view. Thus, since balance of the oscillation becomes good and the optical portion 202 can be stably oscillated, a deflection behavior of an image is also stable. As a result, an image with a high resolution can be stably projected.

The movable portions 204 according to the embodiment are configured to surround the entire edge of the optical portion 202, but may not necessarily surround the entire edge of the optical portion 202. For example, a part of the edge may be lost.

Figure 7:
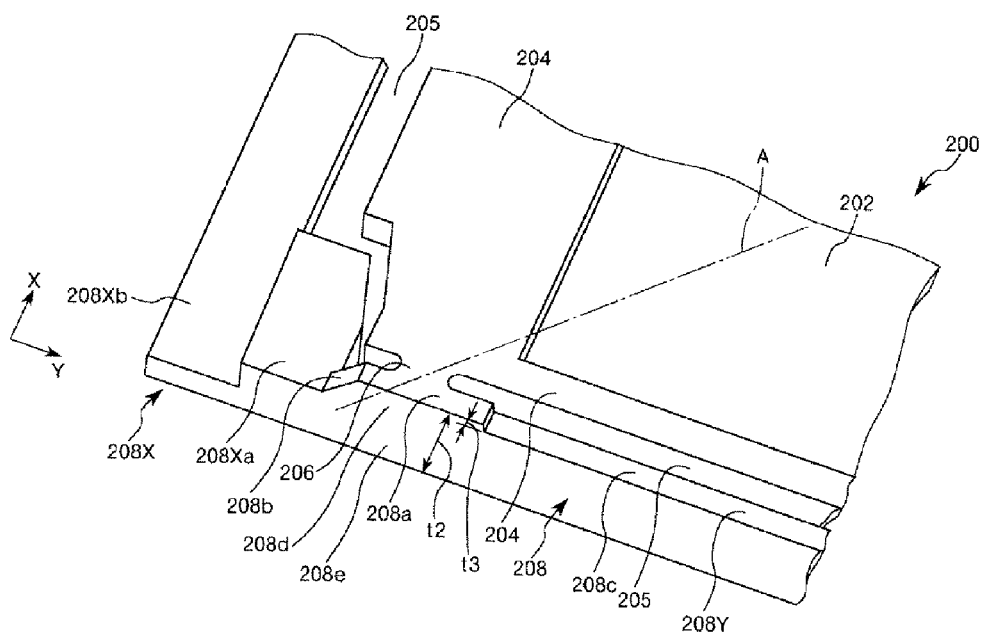
FIG. 7 is a partially enlarged perspective view illustrating the functional portions illustrated in FIG. 4 when viewed from the front surface side.
Figure 8:
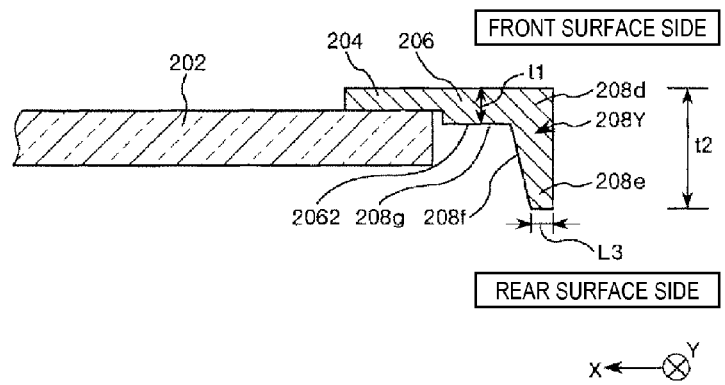
FIG. 8 is a cut sectional view illustrating the functional portions when cut along an oscillation axis A of FIG. 7.

Here, FIG. 7 is a partially enlarged perspective view illustrating the functional portions illustrated in FIG. 4 when viewed from the front surface side. FIG. 8 is a cut sectional view illustrating the functional portions when cut along an oscillation axis A of FIG. 7. In the following description, a length in the vertical direction (that is, the normal line direction of the light incident surface of the optical portion 202) of FIG. 8 is referred to as a "thickness."

When the functional portions 200 illustrated in FIG. 4 are viewed from the opposite side to the rear surface illustrated in FIG. 4, that is, the front surface, a front surface 208a of a portion supporting the shaft portion 206 in the fixing portion 208Y protrudes toward the most front surface side in the functional portions 200, as illustrated in FIG. 7. On the other hand, in the embodiment, the rear surfaces of the functional portions 200 are flat surfaces. Therefore, in the fixing portion 208Y, the thickness of a portion corresponding to the front surface 208a is thickest. Accordingly, since the thickness of the fixing portion 208Y corresponding to the front surface 208a is large, the fixing portion 208Y easily functions as a fixing end of the shaft portion 206 for an oscillation motion of the movable portion 204, and thus a resonant frequency of the oscillation can be set to be high. When the resonant frequency is high, a response speed of the optical path deflection element 2 is high, and thus high image quality can be achieved.

Of the front surface of the fixing portion 208Y, a front surface 208b mutually adjacent to the side of the fixing portion 208X of the front surface 208a described above is inclined to be closer to the rear surface side, as the front surface 208b is more distant from the front surface 208a from the front surface 208a to the fixing portion 208X. The thickness of the fixing portion 208Y gradually decreases accordingly (see FIG. 7).

The fixing portion 208X includes a first portion 208Xa and a second portion 208Xb located outside the first portion 208Xa, that is, on a side more distant from the oscillation axis A than the first portion 208Xa. The above-described inclined front surface 208b continues with the front surface of the first portion 208Xa.

On the other hand, of the front surface of the fixing portion 208Y, a front surface 208c mutually adjacent to the opposite side to the fixing portion 208X illustrated in FIG. 7 (mutually adjacent to the front surface 208a of FIG. 7 on the +Y side) is located on the rear surface side rather than the front surface 208a and is configured such that the thickness of the fixing portion 208Y decreases. A stepped difference is formed between the front surfaces 208a and 208c.

As the result of such a configuration, the thickness of the fixing portion 208Y decreases continuously or stepwise as the fixing portion 208Y is more distant from the front surface 208a of the portion supporting the shaft portion 206 in the Y axis direction (in the extension direction of the fixing portion 208Y).

Incidentally, FIG. 8 illustrates a cut sectional surface when the fixing portion 208Y and the shaft portion 206 and the like connected to the fixing portion 208Y are cut along the oscillation axis A (see FIG. 7) in the thickness direction.

Since the movable portion 204 itself oscillates, the thickness of the movable portion 204 is less than that of the fixing portion 208Y. Thus, reduction in the mass is achieved, and thus the movable portion 204 can be easily oscillated even with a smaller driving force.

The thickness of the shaft portion 206 is also less than that of the fixing portion 208Y. Thus, the shaft portion 206 is more easily twisted, and thus a sufficient oscillation displacement amount can be ensured even with a smaller driving force.

On the other hand, the fixing portion 208Y is configured such that the cross-sectional surface (a cut sectional surface of a surface orthogonal in the extension direction) has a shape elongate in the thickness direction. That is, the shape of the cross-sectional surface of the fixing portion 208Y is an elongate shape with a major axis in the thickness direction. The end of the fixing portion 208Y on the front surface side is connected to the shaft portion 206, as illustrated in FIG. 8. This portion is referred to as a "shaft portion connection portion 208d."

On the other hand, the end of the fixing portion 208Y on the rear surface side is not connected to the shaft portion 206 and serves as a free end, as illustrated in FIG. 8. This portion is referred to as a "free end portion 208e."

Here, when a driving force is given to the fixing portion 208Y by the driving portion 230, the shaft portion 206 is oscillated to be twisted. As an angle (oscillation angle) at which the shaft portion 206 is twisted increases, the driving force is also spread to the fixing portion 208Y. As described above, since the thickness of the fixing portion 208Y is set to be greater than the thickness of the shaft portion 206 and a part of the fixing portion 208Y in the thickness direction serves as the free end portion 208e, the driving force speared to the fixing portion 208Y displaces the fixing portion 208Y in the thickness direction (the vertical direction of FIG. 8) or the X axis direction (the horizontal direction of FIG. 8). As a result, compared to a case in which the fixing portion 208Y is not displaced, that is, a flexible property is not given to the fixing portion 208Y, local stress concentration in the fixing portion 208Y is alleviated, and thus deterioration in the characteristics of the functional portions 200 caused due to the stress concentration can be suppressed. The fixing portion 208Y according to the embodiment is displaced in the thickness direction and the free end portion 208e is also displaced in the horizontal direction of FIG. 8, thereby contributing to the alleviation of the stress concentration.

By alleviating the stress concentration in the shaft portion 206 or the fixing portion 208Y, an improvement in durability at the time of adding a shock to the functional portions 200, that is, shock resistance, can be achieved. This is because a width in which stress newly occurring due to a shock can be allowed can be enlarged as the result obtained by achieving the reduction in the stress occurring in the shaft portion 206 or the fixing portion 208Y. As a result, it is possible to obtain the projector 1 with high reliability.

By alleviating the stress concentration in the shaft portion 206 or the fixing portion 208Y, it is possible to suppress the deterioration in the driving characteristics of the functional portions 200 even when the temperature of the functional portions 200 increases. This is also an effect obtained because the allowable width of thermal stress occurring with the increase in the temperature is enlarged with the achievement of the reduction in the stress occurring in the shaft portion 206 or the fixing portion 208Y.

Of the fixing portion 208Y, the thickness of the portion supporting the shaft portion 206 is greater than the thickness of the portion adjacent to this portion. Therefore, it is possible to ensure a larger displacement amount when the free end portion 208e is displaced. That is, the fixing portion 208Y has not only the function of supporting the shaft portion 206 but also a function of a "beam" oscillating the movable portion 204. Therefore, the free end portion 208e can be displaced more greatly, and thus the alleviation width of stress occurring inside the fixing portion 208Y can be accordingly further enlarged.

By displacing the fixing portion 208Y actively, as described above, with the twisting of the shaft portion 206, it is possible to compensate for an oscillation angle of the shaft portion 206. That is, by deforming the fixing portion 208Y even when the oscillation angle of the shaft portion 206 itself is not set to be large, the oscillation angle can be accordingly set to be large in all of the functional portions 200.

In FIG. 8, the movable portion 204 is formed to cover a part of the front surface of the optical portion 202, but the connection of the optical portion 202 and the movable portion 204 is not limited to the form illustrated in FIG. 8. For example, a connection form may be configured such that a side surface (a surface connecting the front surface to the rear surface) of the optical portion 202 and a side surface (a surface connecting the front surface to the rear surface) of the movable portion 204 face each other.

Figure 9:
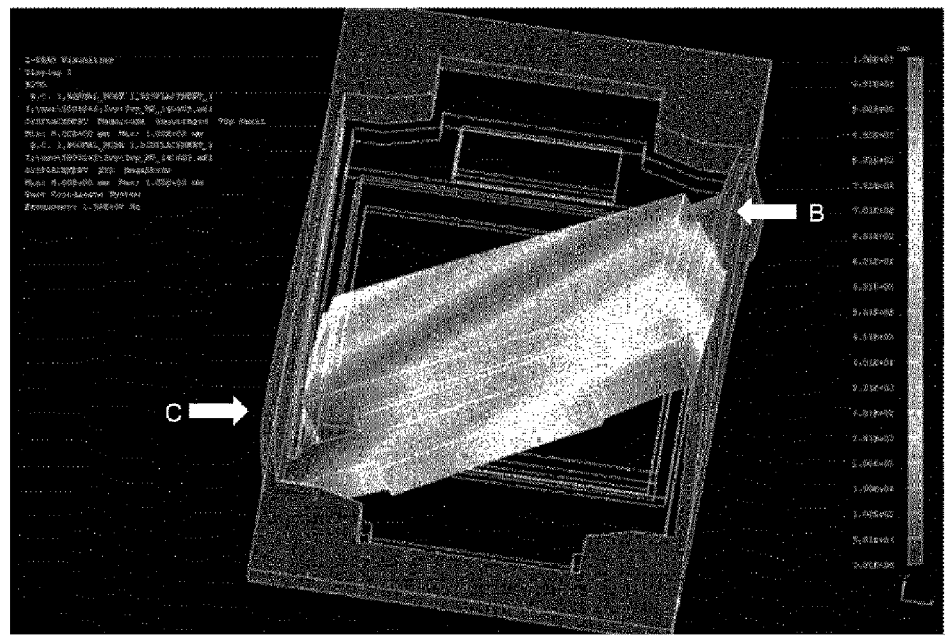
FIG. 9 is a diagram illustrating a simulation of a displacement state when the functional portions illustrated in FIG. 4 are oscillated about the oscillation axis A.
Figure 10:
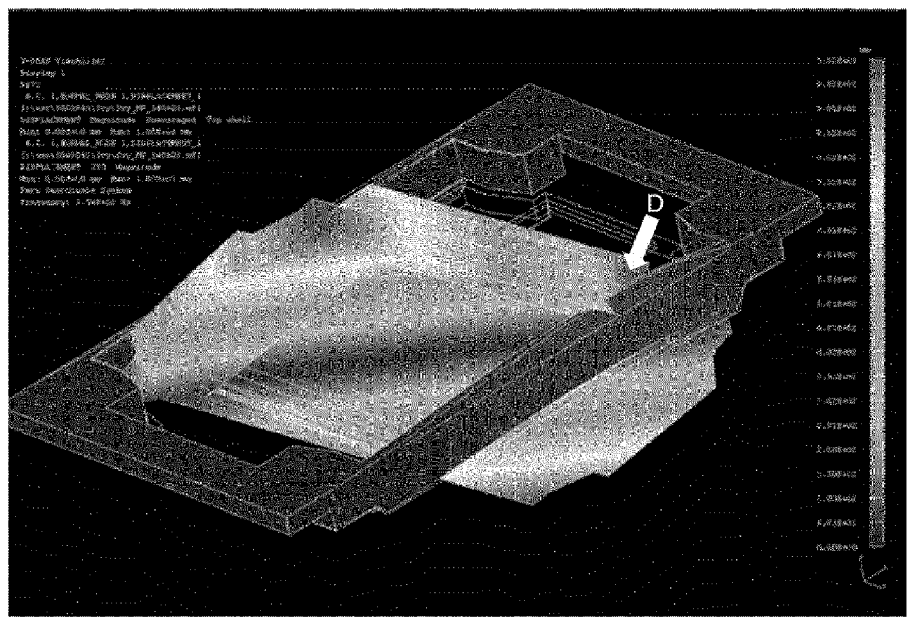
FIG. 10 is a diagram illustrating the simulation of the displacement state when the functional portions illustrated in FIG. 4 are oscillated about the oscillation axis A.

Here, FIGS. 9 and 10 are diagrams illustrating a simulation of a displacement state when the functional portions illustrated in FIG. 4 are oscillated about the oscillation axis A. In FIGS. 9 and 10, a displacement amount in the oscillation is illustrated in an emphasis manner. FIGS. 9 and 10 are different from each other in the position of a viewpoint when illustrated.

As illustrated in FIGS. 9 and 10, the optical portion 202 and the movable portions 204 are oscillated about the oscillation axis A passing the shaft portions 206 while maintaining the shapes thereof. At this time, as indicated by an arrow B in FIG. 9, the free end portion 208e of the fixing portion 208Y is displaced to be curved to the left side of FIG. 9. Similarly, the free end portion 208e of the fixing portion 208Y in a portion indicated by an arrow C is displaced to be curved to the left side of FIG. 9.

As indicated by an arrow D, displacement of the free end portion 208e of the fixing portion 208Y in the thickness direction (the upper side in the portion indicated by the arrow D illustrated in FIG. 10) is illustrated in FIG. 10. In this way, by deforming the free end portion 208e, it is possible to compensate for the oscillation angle of the shaft portion 206. As a result, as described above, even when the shaft portion 206 is short and it is difficult to ensure a oscillation angle, a sufficient oscillation angle can be ensured in all of the functional portions 200.

In other words, when the fixing portion 208Y cannot be displaced, as described above, (for example, when the entire fixing portion 208Y is fixed), a necessary displacement amount is necessarily supplied with only the shaft portion 206. In this case, in order not to increase the stress occurring in the shaft portion 206 too much, the length of the shaft portion 206 is set to be sufficiently long. However, when the shaft portion 206 is too long, the functional portions 200 may increase in size. Further, a problem may arise in that the projector 1 increases in size.

Conversely, when the fixing portion 208Y can be displaced, as described above, a sufficient oscillation angle is ensured even when the shaft portion 206 is short. Thus, the shaft portion 206 can be shortened while suppressing an increase in stress. Further, the functional portions 200 and the projector 1 can be miniaturized.

Of the fixing portion 208Y, a side surface 208f facing the side of the optical portion 202 is oblique to the front surface and the rear surface of the fixing portion 208Y, as illustrated in FIGS. 6 and 8. That is, the side surface 208f of the fixing portion 208Y is an oblique surface oblique so that the length of the side surface 208f in the X axis direction gradually increases from the side of the free end portion 208e to the side of the shaft portion connection portion 208d. In such a configuration, stress rarely concentrates on a connection portion between the fixing portion 208Y and the shaft portion 206, and thus it is possible to suppress deterioration in the characteristics of the fixing portion 208Y or the shaft portion 206.

A length L1 of the shaft portion 206 in the X axis direction is appropriately set according to the sizes of the functional portions 200 and is not particularly limited. The length L1 is preferably about 0.2 mm or more and about 5 mm or less and is more preferably about 0.5 mm or more and about 3 mm or less.

On the other hand, a thickness t1 of the shaft portion 206 is appropriately set according to the sizes of the functional portions 200. The thickness t1 is preferably about 0.5 mm or more and about 7 mm or less and is more preferably about 1 mm or more and about 5 mm or less.

A ratio L1/t1 of the length L1 to the thickness t1 of the shaft portion 206 is preferably about 0.2 or more and about 3 or less, is more preferably about 0.3 or more and about 1 or less, and is further more preferably about 0.4 or more and about 0.8 or less. Thus, it is possible to obtain the shaft portion 206 with an excellent twistable property while suppressing deterioration in the mechanical characteristics of the shaft portion 206.

The side surface 208f of the fixing portion 208Y may continue with a rear surface 2062 of the shaft portion 206. However, as illustrated in FIGS. 6 and 8, a step 208g formed along the fixing portion 208Y is preferably formed between the side surface 208f of the fixing portion 208Y and the rear surface 2062 of the shaft portion 206. By forming such a step 208g, stress rarely concentrates due to connection of the fixing portion 208Y and the shaft portion 206. The step 208g is a surface parallel to the rear surface of the fixing portion 208Y and is the same surface as the rear surface 2062 of the shaft portion 206.

A length L2 of the step 208g in the X axis direction is appropriately set according to the sizes of the functional portions 200 and is not particularly limited. The length L2 is preferably about 0.03 mm or more and about 2 mm or less and is more preferably about 0.1 mm or more and about 1 mm or less. By setting the length L2 within the foregoing range, it is possible to alleviate the stress concentration on the connection portion of the fixing portion 208Y and the shaft portion 206.

A ratio L2/L1 of the length L2 of the step 208g to the length L1 of the shaft portion 206 is preferably about 0.05 or more and about 0.8 or less and is more preferably about 0.1 or more and about 0.5 or less.

A length L3 of the rear surface of the fixing portion 208Y in the X axis direction is also appropriately set according to the sizes of the functional portions 200 and is not particularly limited. The length L3 is preferably about 0.3 mm or more and about 5 mm or less and is more preferably about 0.5 mm or more and about 2 mm or less.

A maximum thickness t2 of the fixing portion 208Y is also appropriately set according to the sizes of the functional portions 200. The maximum thickness t2 is preferably about 2 mm or more and about 10 mm or less and is more preferably about 3 mm or more and about 7 mm or less.

A ratio L3/t2 of the length L3 to the maximum thickness t2 of the fixing portion 208Y is preferably about 0.05 or more and about 0.8 or less and is more preferably about 0.1 or more and about 0.5 or less. Thus, a sufficient displacement amount is given to the free end portion 208e of the fixing portion 208Y. As a result, it is possible to particularly alleviate local stress concentration in the fixing portion 208Y and increase the oscillation angle of the shaft portion 206 more easily.

When an entire length of the functional portions 200 in the Y axis direction illustrated in FIG. 5 is assumed to be L4, although the entire length L4 is not particularly limited, for example, the entire length L4 is preferably about 20 mm or more and about 150 mm or less and is more preferably about 40 mm or more and about 90 mm or less.

Each of lengths L5 and L6 illustrated in FIG. 5 is not particularly limited, and is preferably about 10 mm or more and about 80 mm or less and is more preferably about 20 mm or more and about 65 mm or less.

Each of lengths L7 and L8 illustrated in FIG. 5 is not particularly limited, and is preferably about 5 mm or more and about 70 mm or less and is more preferably about 10 mm or more and about 60 mm or less. A ratio L7/L8 of the length L7 to the length L8 is appropriately set according to, for example, an aspect ratio of the liquid crystal display elements 108R, 108G, and 108B.

A length L9 illustrated in FIG. 5 is not particularly limited, and is preferably about 3 mm or more and about 40 mm or less and is more preferably about 5 mm or more and about 30 mm or less.

A length L10 illustrated in FIG. 5 is not particularly limited, and is preferably about 10 mm or more and about 80 mm or less and is more preferably about 20 mm or more and about 60 mm or less.

As illustrated in FIG. 7, a height t3 of a step difference between the front surface 208a of the fixing portion 208Y and the front surface 208c adjacent to the front surface 208a is not particularly limited, and is preferably about 0.1 mm or more and about 2 mm or less and is more preferably about 0.2 mm or more and about 1 mm or less.

Casing

The casing 220 includes a bottom portion 221 having a flat plate shape and two leg portions 222 standing from the edges of the bottom portion 221.

The bottom portion 221 is formed in a rectangular shape in a plan view and is located on the front surface side of the functional portions 200 described above.

The leg portions 222 are convex sections standing from the edges of two sides facing each other among four sides of the bottom portion 221. The functional portions 200 are placed to be interposed between the two leg portions 222.

Although not illustrated, an open hole is formed in the bottom portion 221 so that the light transmitted through the optical portion 202 can pass through the open hole. Thus, propagation of the light deflected by the optical portion 202 is prevented from being obstructed by the bottom portion 221.

When the bottom portion 221 has translucency, the above-described open hole may not be necessary.

A material of the casing 220 is not particularly limited. For example, a metal material such as aluminum can be used.

A casing fitting portion 224 (support portion) mechanically connects the casing 220 to the functional portions 200. The casing fitting portion 224 illustrated in FIG. 3 includes a frame portion 225 that has a frame shape in a plan view and an extension portion 226 that is formed by extending a part of the frame portion 225 outward (outside the frame portion 225).

Parts of the frame portion 225 are configured to be mechanically connected to the fixing portions 208X of the functional portions 200. On the other hand, the extension portion 226 is mechanically connected to the leg portions 222 of the casing 220 described above. Vibration damping members (not illustrated) such as vibration damping washers may be provided between the frame portion 225 and the fixing portions 208X or between the extension portion 226 and the leg portions 222 to mechanically connect each portion. Thus, it is possible to rarely transfer vibration at the time of the oscillation of the functional portions 200 to the casing 220. The fixing portion 208X may be mechanically connected directly to any spot of the casing 220 without providing the casing fitting portion 224. Even in this case, vibration damping members may be provided between the fixing portions 208X and the casing 220 to mechanically connect therebetween.

In this way, since the functional portions 200 are fixed to the casing 220 in the fixing portions 208X, it is possible to avoid direct fixing of the fixing portions 208Y to the casing 220. Thus, the fixing portions 208Y can be displaced with a sufficient displacement amount, as described above, and thus the optical portion 202 can be oscillated at a necessary oscillation angle without causing local stress concentration.

A method of fixing the functional portions 200 to the casing 220 is not limited to the method using the above-described casing fitting portion 224. For example, the casing fitting portion 224 may be omitted and the functional portions 200 may be directly fixed to the casing 220.

The method of connecting the functional portions 200 to the casing fitting portion 224 and the method of connecting the casing fitting portion 224 to the casing 220 are not particularly limited. For example, a method using a connection tool such as a screw or a method using an adhesive or an adhesion tape can be used.

The fixing portions 208 according to the embodiment are formed in the frame shape, but are not limited to such a shape. Any shape may be used as long as the shape can support the shaft portions 206.

The optical portion 202 and the movable portions 204 may be adhered according to any method, but are adhered via, for example, an adhesive. Examples of the adhesive include an epoxy-based adhesive, an acrylic-based adhesive, and a silicon-based adhesive.

Driving Portion

Next, the driving portion 230 will be described.

The driving portion 230 according to the embodiment includes a magnet 232 that is fixed to the rear surface of one of the two movable portions 204X, a circular coil 234 that is fixed to the fixing portion 208X, and a coil fitting portion 236 that is interposed between the coil 234 and the fixing portion 208X and fits the coil 234 to the fixing portion 208X.

The magnet 232 is configured as, for example, a permanent magnet. By fixing the magnet 232 to the movable portion 204X, a magnetic field can be generated, and thus a driving force can be generated for the movable portion 204X through magnetic interaction along with a magnetic field generated from the coil 234.

Examples of the permanent magnet include a neodymium (FeNdB) magnet, a ferrite magnet, a samarium-cobalt magnet, an alnico magnet, and a FeCo-based magnet.

The coil 234 is formed in a circular shape and is configured as, for example, a layered winding coil, and a voice coil. The coil 234 may be an air-core coil or may include any core.

One surface of the coil 234 is fixed to the coil fitting portion 236. Thus, magnetic interaction is generated between the magnet 232 and the coil 234, and thus a driving force is generated in the magnet 232. A predetermined gap is formed between the magnet 232 and the coil 234 so that the movable portion 204 including the magnet 232 can be oscillated by the driving force.

In the driving portion 230 according to the embodiment, a so-called moving magnet type electromagnetic actuator scheme in which a magnet side is oscillated is adopted. However, the driving scheme is not particularly limited and the driving portion 230 may have a so-called moving coil type driving scheme of oscillating a coil side.

FIG. 11A is a plan view schematically illustrating the movable portion 204 and the magnet 232 fixed to the movable portion 204. FIG. 11B is a side view schematically illustrating the magnet 232 illustrated in FIG. 11A and the coil 234 provided to correspond to the magnet 232.

When a voltage is applied to the coil 234 illustrated in FIG. 11B, a force driving the magnet 232 upward or downward in FIG. 11B is generated in accordance with an application direction of the voltage and a direction of the magnetic field generated from the magnet 232. For example, when the N pole and the S pole are generated, as illustrated in FIG. 11B, the magnet 232 can be driven so the magnet 232 approaches the coil 234.

The driving portion 230 illustrated in FIGS. 11A and 11B is the driving portion according to the embodiment. The driving portions 230 illustrated in FIGS. 11C to 11H are different configuration examples of the driving portion 230 in which the electromagnetic actuator scheme is applied.

The driving portion 230 illustrated in FIGS. 11A and 11B is a driving portion of a type in which the magnet 232 and the coil 234 are disposed asymmetrically with respect to the oscillation axis A and which is driven by adding a moment to the movable portion 204 (axis asymmetry moment type).

On the other hand, the driving portion 230 illustrated in FIGS. 11C and 11D is the same as the driving portion 230 illustrated in FIGS. 11A and 11B from the viewpoint of typing called axis asymmetry moment type, but differs in that the disposition of the magnet 232 in the movable portion 204 differs. That is, in the driving portion 230 illustrated in FIGS. 11C and 11D, the magnet 232 is disposed at a position which is most distant from the oscillation axis A in the movable portion 204. Thus, the movable portion 204 can be easily driven even with a small magnetic force.

In the driving portion 230 illustrated in FIGS. 11E and 11F, the positions of the N pole and the S pole of the magnet 232 differ from those of the moment type driving portion 230 so that lines of magnetic force are radiated in parallel to a plane direction of the movable portion 204. In the coil 234, the direction of the coil 234 also differs from that of the moment type driving portion 230 so that the winding axis is parallel to the plane direction of the movable portion 204. Even when the magnet 232 and the coil 234 are disposed in this way, a driving force can be given to the magnet 232 (axis asymmetry torque type). The coil 234 including a winding wire 2341 and a core 2342 is preferably used.

On the other hand, the driving portion 230 illustrated in FIGS. 11G and 11H is the same as the driving portion 230 illustrated in FIGS. 11E and 11F from the viewpoint of typing called a torque type, but differs in that the disposition of the magnet 232 in the movable portion 204 differs. That is, in the driving portion 230 illustrated in FIGS. 11G and 11H, the magnet 232 is disposed so that line symmetry is satisfied for the oscillation axis A in the movable portion 204. Thus, there is the advantage in which a driving frequency is easily increased (axis symmetry torque type).

The driving scheme for the driving portion 230 is not limited to the above-described schemes, but a piezoelectric driving scheme or other driving schemes may be used.

The position of the driving portion 230 or the number of driving portions 230 is not limited to the illustrated position or number. For example, the plurality of driving portions 230 may correspond to one moving portion 204.

The size of the driving portion 230 is not particularly limited. For example, when the magnet 232 has the rectangular shape illustrated in FIG. 5, the length of the shorter side is preferably about 1 mm or more and about 10 mm or less and the length of the longer side is preferably about 5 mm or more and about 30 mm or less.

Operation of Optical Path Deflection Element

Next, an operation of the optical path deflection element 2 will be described. The operation of the optical path deflection element 2 may be the same as the operation described in, for example, JP-A-2012-013766.

Figure 12:
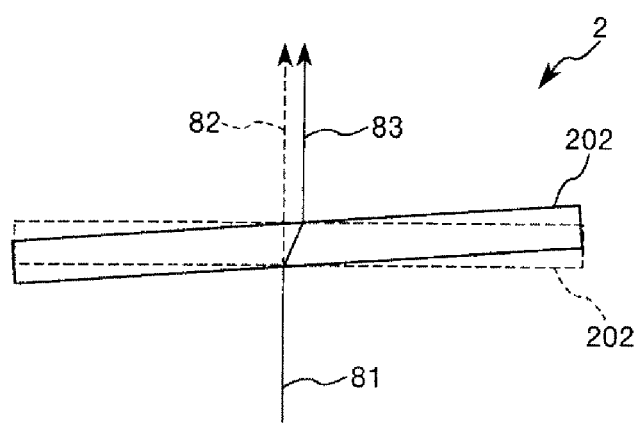
FIG. 12 is a diagram illustrating a principle in which the optical path deflection element illustrated in FIG. 3 deflects light.
Figure 13:
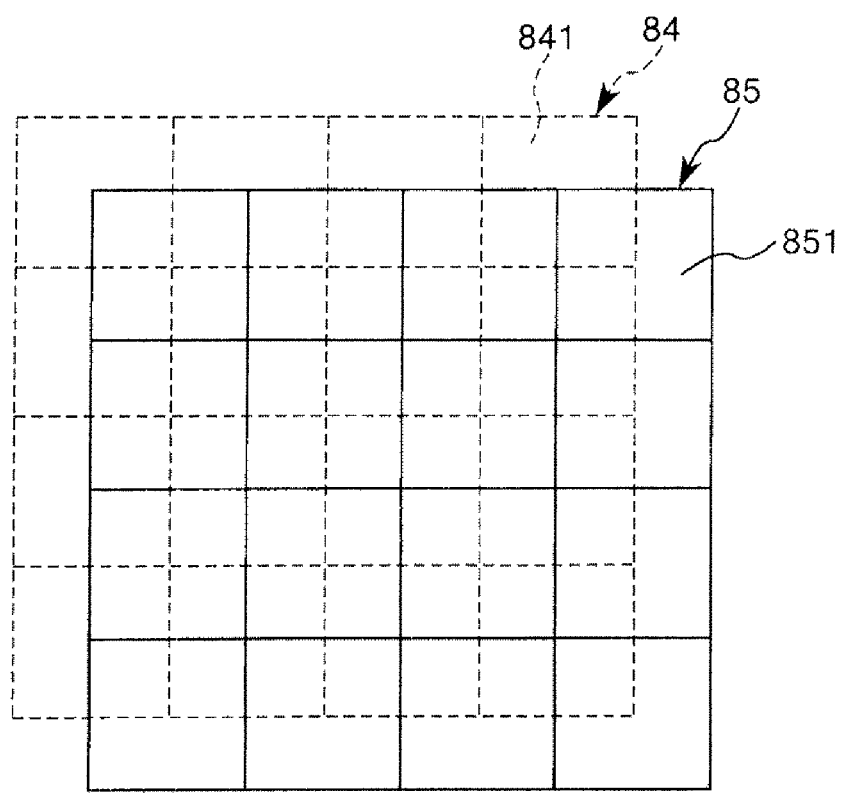
FIG. 13 is a diagram illustrating the principle in which the optical path deflection element illustrated in FIG. 3 deflects light.

FIGS. 12 and 13 are diagrams illustrating a principle in which the optical path deflection element illustrated in FIG. 3 deflects light.

When no voltage is applied to the coil 234, the optical portion 202 is not oscillated in the optical path deflection element 2. Therefore, as indicated by a dotted line in FIG. 12, an incident angle of light 81 which is incident on the optical portion 202 is a right angle, and thus the light 81 becomes straight light 82 without refraction to be exited.

Conversely, when a predetermined voltage is applied to the coil 234, the optical portion 202 is oblique, for example, as indicated by a solid line in FIG. 12, the light 81 incident on the optical portion 202 in this state is refracted when transmitted through the optical portion 202, and then becomes light 83 to be exited. Since the light 83 is deviated from the light 82 in a space, an image formed by the light 83 is projected to the screen 8 in a state in which the image is deviated from an image formed by the light 82.

FIG. 13 illustrates images 84 and 85 in which pixels of 4 vertical rows and 4 horizontal columns are disposed in a matrix form. The image 84 is a collective of pixels 841 formed by the light 82 illustrated in FIG. 12 and the image 85 is a collective of pixels 851 formed by the light 83 illustrated in FIG. 12.

FIG. 13 illustrates an example in which the image 84 is shifted to the image 85 by oscillating the optical portion 202. At this time, a shift amount is half of the pitch of the pixel 841. As a result, the number of pixels of the image 85 projected to the screen 8 is twice the number of pixels of the image 84, and thus a high resolution of the image is achieved.

As described above, the image 85 is shifted obliquely in the array direction of the pixels 841. Therefore, the number of pixels of the image 85 is substantially twice in the vertical and horizontal sides.

A shift amount of the image shifted by the optical path deflection element 2 is not limited to the half of the pitch of the pixel, but may be, for example, ¼ or ⅛.

Second Embodiment

Next, an optical path deflection element to which a second embodiment of the optical device according to the invention is applied will be described.

Figure 14:
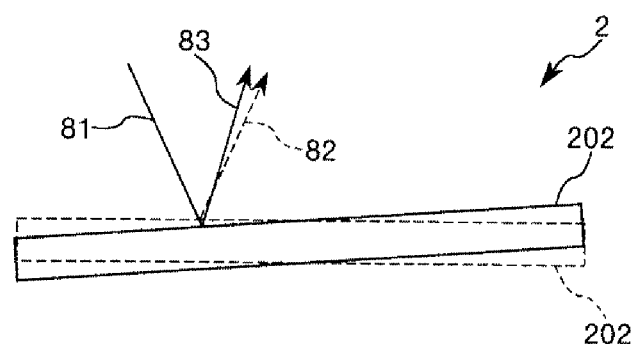
FIG. 14 is a diagram illustrating a principle in which an optical path deflection element to which a second embodiment of the optical device according to the invention is applied deflects light.

FIG. 14 is a diagram illustrating a principle in which the optical path deflection element to which the second embodiment of the optical device according to the invention is applied deflects light. In FIG. 14, the same reference numerals are given to the same configurations as those of the above-described embodiment.

An optical path deflection element 2 according to the embodiment is the same as the optical path deflection element 2 according to the first embodiment except for a difference in the principle in which an optical portion 202 deflects light.

That is, the optical portion 202 according to the embodiment has a light reflection property, and thus this point differs from the first embodiment in which the optical portion has light transmission property.

When no voltage is applied to the coil 234, the optical portion 202 is not oscillated in the optical path deflection element 2. Therefore, as indicated by a dotted line in FIG. 14, light 81 incident on the optical portion 202 is reflected as light 82 indicated by a dotted line.

Conversely, when a predetermined voltage is applied to the coil 234, the optical portion 202 is oblique, for example, as indicated by a solid line in FIG. 14. When the optical portion 202 is oblique, an incident angle of the light 81 that is incident on the optical portion 202 and an exit angle of the light 81 are changed. Therefore, the light 81 is reflected as light 83 indicated by a solid line. Accordingly, by changing the posture of the optical portion 202 so that a target incident angle is achieved, it is possible to control a deflection direction or a deflection amount of the light 83 (reflected light). Since the light 83 is deviated from the light 82 in a space, an image formed by the light 83 is projected to the screen 8 in a state in which the image is deviated from an image formed by the light 82. As a result, a projector including the optical path deflection element 2 has the same advantage as the projector according to the first embodiment.

The material of the optical portion 202 according to the embodiment is not particularly limited as long as the material has the light reflection property. For example, a member in which a reflection film is attached to a material exemplified as the material of the optical portion 202 according to the first embodiment can be exemplified in addition to a material having gloss, such as silicon or metal.

Even in the above-described second embodiment, it is possible to obtain the same operations and advantages as those of the first embodiment.

Third Embodiment

Next, an optical scanner to which a third embodiment of the optical device according to the invention is applied and a projector to which the third embodiment of the image display apparatus according to the invention is applied will be described.

Figure 15:
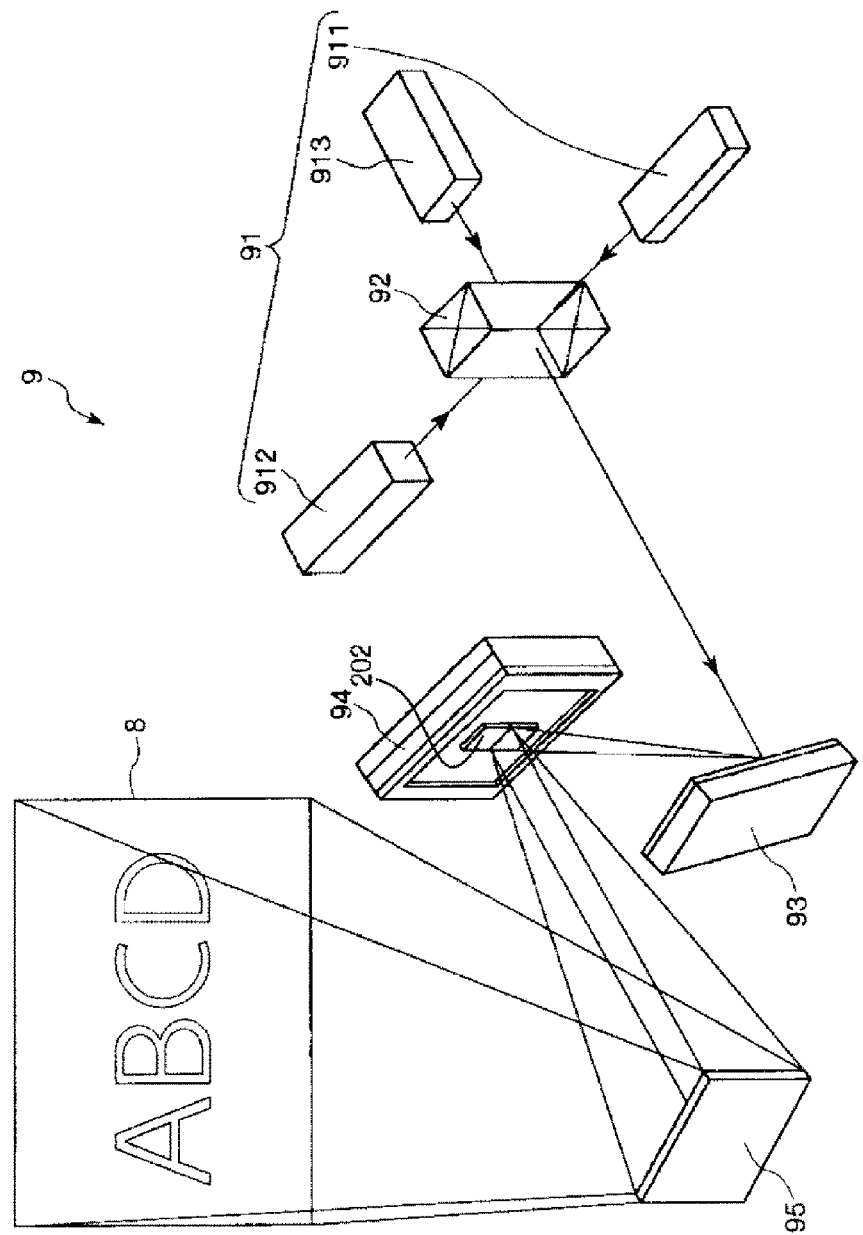
FIG. 15 is a diagram illustrating an optical configuration of a projector to which a third embodiment of an image display apparatus according to the invention is applied.

FIG. 15 is a diagram illustrating an optical configuration of the projector to which the third embodiment of the image display apparatus according to the invention is applied. In FIG. 15, the same reference numerals are given to the same configurations as those of the above-described embodiment.

A projector 9 according to the embodiment is a scanning type projector that forms an image by scanning light and is the same as the projector 1 according to the first embodiment except that an optical scanner 94 to which the third embodiment of the optical device according to the invention is applied is included.

That is, the projector 9 according to the embodiment includes a light source device 91 that emits light such as laser, a cross dichroic prism 92, an optical scanner 93 that serves to perform main scanning, an optical scanner 94 (the third embodiment of the optical device according to the invention) that serves to perform sub-scanning, and a fixed mirror 95.

A light source device 91 illustrated in FIG. 15 includes a red light source device 911 that radiates red light, a blue light source device 912 that radiates blue light, and a green light source device 913 that radiates green light.

The cross dichroic prism 92 is configured such that four right-angle prisms are bonded and is an optical element that combines the light radiated from the red light source device 911, the blue light source device 912, and the green light source device 913.

The projector 9 is configured such that light is radiated from each of the red light source device 911, the blue light source device 912, and the green light source device 913 based on image information from a host computer (not illustrated), the light is combined by the cross dichroic prism 92, the combined light is allowed to scan by the optical scanners 93 and 94, the light is reflected by the fixed mirror 95, and a color image is formed on the screen 8.

Here, the optical scanning of the optical scanners 93 and 94 will be described specifically.

The light combined by the cross dichroic prism 92 is allowed to scan in the horizontal direction by the optical scanner 93 (main scanning). The light allowed to scan in the horizontal direction is further allowed to scan in the vertical direction by the optical scanner 94 (sub-scanning). Thus, a two-dimensional color image can be formed on the screen 8. By using the optical device according to the invention as the optical scanner 94, excellent drawing characteristics can be exerted.

In the optical scanner 94, an optical path can be deflected while the light is reflected in the optical portion 202. As a result, a high resolution can be realized.

However, the invention is not limited to the projector 9 as long as the light is allowed to scan by the optical scanners 93 and 94 and an image is formed to a target object. For example, the fixed mirror 95 may be omitted.

The optical device according to the invention may also be applied to the optical scanner 93.

Even in the above-described third embodiment, it is possible to obtain the same operations and advantages as those of the first and second embodiments.

Fourth Embodiment

Next, a head-mounted display to which a fourth embodiment of the image display apparatus according to the invention is applied will be described.

Figure 16:
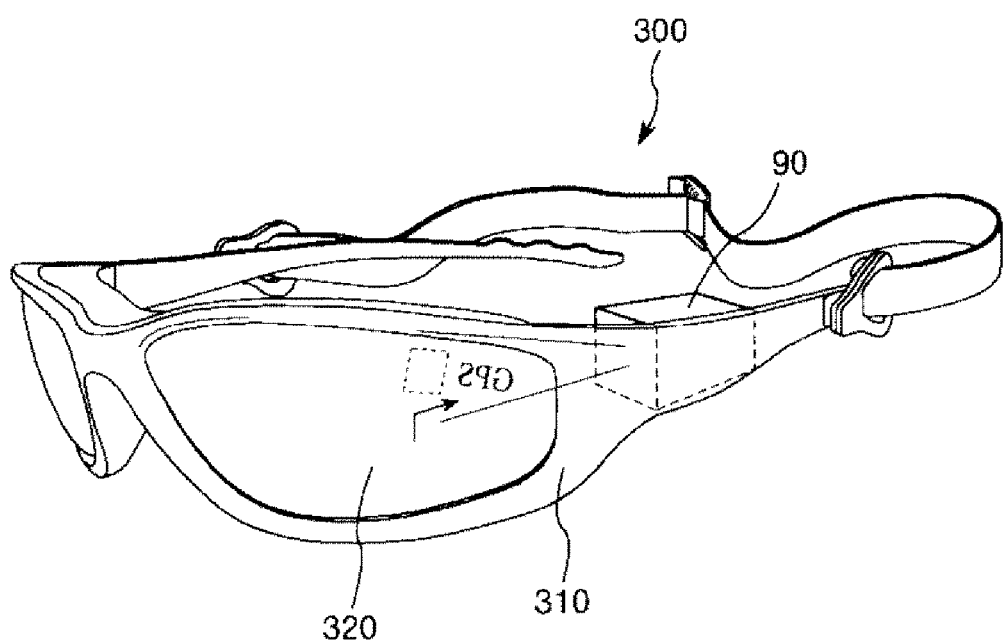
FIG. 16 is a perspective view illustrating a head-mounted display to which a fourth embodiment of the image display apparatus according to the invention is applied.

FIG. 16 is a perspective view illustrating the head-mounted display to which the fourth embodiment of the image display apparatus according to the invention is applied. In FIG. 16, the same reference numerals are given to the same configurations as those of the above-described embodiment.

A head-mounted display 300 illustrated in FIG. 16 includes glasses 310 and a video output unit 90 mounted on the glasses 310. The video output unit 90 has the same configuration as the projector 9 according to the third embodiment. The video output unit 90 displays a predetermined image viewed with one eye on a display unit 320 provided in a site which is originally a lens of the glasses 310.

The display unit 320 may be transparent or opaque. When the display unit 320 is transparent, information from the video output unit 90 can be overlapped on information from the real world to be used.

Two video output units 90 may be provided in the head-mounted display 300 so that images viewed with both eyes are displayed on two display units.

Even in the above-described fourth embodiment, it is possible to obtain the same operations and advantages as those of the first to third embodiments.

The optical device and the image display apparatus according to the invention have been described according to the illustrated embodiments, but the invention is not limited thereto. For example, in the optical device and the image display apparatus according to the invention, the configuration of each unit can be substituted with any configuration with the same function and any optional configuration can also be added.

In the invention, two or more configurations (features) may be combined in each of the foregoing embodiments.

The optical device according to the invention can also be applied to, for example, a light switch or a light attenuator in addition to the optical path deflection element.

The image display apparatus according to the invention can also be applied to a printer and a head-up display (HUD) in addition to a projector or a head-mounted display (HMD).

The entire disclosure of Japanese Patent Application No. 2014-223706 filed Oct. 31, 2014 is expressly incorporated by reference herein.

What is claimed is:

1. An optical device comprising:
   an optical portion that has a light incident surface on which light is incident;
   a movable portion that supports the optical portion;
   a shaft portion that supports the movable portion so that the movable portion is oscillatable; and
   a fixing portion that is connected to the shaft portion,
   wherein the fixing portion has a thickness greater than the shaft portion and includes a portion of which an end not connected to the shaft portion serves as a free end, and
   wherein an elastic modulus of each of the movable portion, the shaft portion, and the fixing portion is smaller than an elastic modulus of the optical portion.

2. The optical device according to claim 1, further comprising:
   a permanent magnet that is provided in the movable portion; and
   a coil that generates a magnetic field to be operated to the permanent magnet.

3. The optical device according to claim 1, further comprising:
   a support portion that supports the fixing portion,
   wherein the support portion supports the fixing portion at a position at which the portion serving as the free end is excluded.

4. An image display apparatus comprising:
   the optical device according to claim 3.

5. The image display apparatus according to claim 4,
   wherein a position of a pixel displayed by radiating the light is shifted by changing an optical path of light exiting from the optical device in the optical device.

6. The optical device according to claim 1,
   wherein each of the movable portion, the shaft portion, and the fixing portion is formed of a resin material.

7. The optical device according to claim 1,
   wherein in the fixing portion, a thickness of a portion connected to the shaft portion is thicker than a thickness of a portion mutually adjacent to the portion connected to the shaft portion.

8. An image display apparatus comprising:
   the optical device according to claim 7.

9. The image display apparatus according to claim 8,
   wherein a position of a pixel displayed by radiating the light is shifted by changing an optical path of light exiting from the optical device in the optical device.

10. The optical device according to claim 1,
    wherein the optical portion transmits light.

11. The optical device according to claim 1,
    wherein the optical portion reflects light.

12. An image display apparatus comprising:
    the optical device according to claim 1.

13. The image display apparatus according to claim 12,
    wherein a position of a pixel displayed by radiating the light is shifted by changing an optical path of light exiting from the optical device in the optical device.

14. The image display apparatus according to claim 12,
    wherein the optical device allows the light to scan to form an image.

15. An optical device comprising:
    an optical portion that has a light incident surface on which light is incident;
    a movable portion that supports the optical portion;
    a shaft portion that supports the movable portion so that the movable portion is oscillatable; and
    a fixing portion that is connected to the shaft portion,
    wherein the fixing portion has a thickness greater than the shaft portion and includes a portion of which an end not connected to the shaft portion serves as a free end, and
    wherein each of the movable portion, the shaft portion, and the fixing portion is formed of a resin material.

* * * * *